United States Patent [19]

Bahl et al.

[11] Patent Number: 4,882,759

[45] Date of Patent: Nov. 21, 1989

[54] SYNTHESIZING WORD BASEFORMS USED IN SPEECH RECOGNITION

[75] Inventors: Lalit R. Bahl, Amawalk; Peter V. deSouza; Robert L. Mercer, both of Yorktown Heights; Michael A. Picheny, White Plains, all of N.Y.

[73] Assignee: International Business Machines Corporation, Armonk, N.Y.

[21] Appl. No.: 853,525

[22] Filed: Apr. 18, 1986

[51] Int. Cl.⁴ .............................................. G10L 5/00
[52] U.S. Cl. ...................................... 381/51; 381/43; 381/36
[58] Field of Search ................................... 381/36–43, 381/51–53; 364/513.5

[56] References Cited

U.S. PATENT DOCUMENTS

| 4,181,821 | 1/1980 | Pirz et al. | 179/1 SD |
| 4,513,436 | 4/1985 | Nose et al. | 381/43 |
| 4,587,670 | 5/1986 | Levinson et al. | 381/43 |
| 4,593,367 | 6/1986 | Slack et al. | 364/513 |

FOREIGN PATENT DOCUMENTS 0025685 3/1981 United Kingdom .
0033412 12/1981 United Kingdom .

OTHER PUBLICATIONS

ICASSP 84 Proceedings of the IEEE International Conf on ASSP, Mar. 1984, vol. 3, pp. 35.6.1–35.6.4 "Improved Hidden Markov Modeling of Phonemes for Continuous Speech Recognition" by R. Schwartz.
ICASSP 84 Proceedings of the IEEE International Conf on ASSP, Mar. 1984 pp. 42.5.1–42.5.4 "An Information Theoretic Approach to the Automatic Determination of Phonemic Baseforms" by J. M. Lucassen.
IEEE Trans on Acoustics, Speech and Signal Processing, vol. ASSP-28, No. 2, Apr. 1980, pp. 129–136, "A Training Procedure for Isolated Word Recognition Systems" by S. Furui.
Research Disclosure, nr. 256, Aug. 1985, p. 418, Abstract No. 25649, Emsworth, Hampshire, GB; "Composite Fenemic Phones".
IBM Technical Disclosure Bulletin, vol. 24, No. 4, Sep. 1981, pp. 2042–2043, New York; L. R. Bahl et al "Automatic Selection of Speech Prototypes".
M. Cravero et al, "Phonetic Units for Hidden Markov Models", CSELT Technical Report, vol. 14, No. 2, Oct. 7, 1986, pp. 121–125.
B. H. Juang et al, "Recent Developments in the Application of Hidden Markov Models to Speaker-Independent Isolated Word Recognition", IEEE, 1985, pp. 1.3.1–1.3.4.
H. Bourlard et al, "Speaker Dependent Connected Speech Recognition via Phonemic Markov Models", IEEE, 1985, pp. 1213–1216.
Y. Kamp et al, "State Reduction in Hidden Markov Chains Used for Speech Recognition", IEEE, 1985, pp. 1138–1145.
R. Schwartz et al, "Context-Dependent Modeling for Acoustic-Phonetic Recognition of Continuous Speech", IEEE 1985, pp. 1205–1208.

(List continued on next page.)

Primary Examiner—Emanuel S. Kemeny
Attorney, Agent, or Firm—Marc A. Block; Marc D. Schechter

[57] ABSTRACT

Apparatus and method for synthesizing word baseforms for words not spoken during a training session, wherein each synthesized baseform represents a series of models from a first set of models, which include: (a) uttering speech during a training session and representing the uttered speech as a sequence of models from a second set of models; (b) for each of at least some of the second set models spoken in a given phonetic model context during the training session, storing a respective string of first set models; and (c) constructing a word baseform of first set models for a word not spoken during the training session, including the step of representing each piece of a word that corresponds to a second set model in a given context by the stored respective string, if any, corresponding thereto.

19 Claims, 10 Drawing Sheets

OTHER PUBLICATIONS

J. P. Mari et al, "Speaker Independent Connected Digit Recognition Using Hidden Markov Models", Speech Tech '85, vol. 1, No. 2, pp. 127–132.

S. Levinson et al, "Speaker Independent Isolated Digit Recognition Using Hidden Markov Models", IEEE, 1983, pp. 1049–1052.

D. M. Choy et al, "Speech Compression by Phoneme Recognition", IBM TDB, vol. 25, No. 6, Nov. 1982, pp. 2884–2886.

R. Bakis et al, "Continuous Speech Recognition via Centisecond Acoustic States", Research Report, 1978, pp. 1–9.

R. Bakis, "Spoken Word Spotting via Centisecond Acoustic States", IBM TDB vol. 18, No. 10, Mar. 1976, pp. 3479–3481.

FIG.11    CAT (PHONETIC) = KQ    AE1    TX    TQ    XX

| PHONETIC ELEMENT | PRECEDING PHONETIC ELEMENT | FOLLOWING PHONETIC ELEMENT | ASSOCIATED FENEMIC MODEL |
|---|---|---|---|
| $\pi_1$ | --- | --- | --- |
| $\pi_2$ | AAO | AAO | |
| $\pi_m$ (AE1) | AAO | AEO | |
| $\pi_{m,1}$ | AAO | SILENCE | |
| $\pi_{m,2}$ | AEO | AAO | |
| $\overline{\pi}_{m,c}$ | K Q | TX | f |
| | ZX | ZX | |
| | SILENCE | AAO | |
| | AAO | SILENCE | |
| $\pi_{69}$ | --- | --- | --- |
| $\pi_{70}$ | | | |

FIG.12

SYNTHESIZING WORD BASEFORMS USED IN SPEECH RECOGNITION

FIELD OF THE INVENTION

The present invention relates to the field of speech recognition or speech understanding in general. In particular, the invention relates to apparatus and method for synthesizing word models for some words from other known word models.

TECHNOLOGICAL CONTEXT OF THE INVENTION

In certain approaches to speech recognition, words in a vocabulary are represented by word models, sometimes referred to as word baseforms. At the IBM Corporation, for example, an experimental speech recognizer represents each word as a sequence of Markov models. Each sequence, it is noted, is itself a Markov model.

The word models are used in conjunction with outputs generated in response to a speech input, in order to match the speech input to words in the vocabulary.

In some techniques, a single set of models is defined. Word baseforms for all words in the vocabulary are to be constructed from models selected from the single defined set.

In other techniques, however, there may be reasons for representing words by several baseforms, wherein each baseform is constructed from models selected from a respective set of models. That is, baseforms constructed of models from a first of models may be employed for one purpose in a speech recognizer, while baseforms constructed of models from a second set of models may be used for another purpose. Furthermore, the several baseforms may be used together in the process of performing acoustic matching or some other purpose.

In most large vocabulary speech recognition systems (of, for example, 5000 words or more), the word baseforms are tailored to each user of the speech recognizer. That is, to determine the values of certain variables associated with each baseform, a user utters a training text of known words. Typically, each word baseform has its variables set directly from data generated during training. When words are to be represented by multiple baseforms (constructed of models from respective sets), a lengthy training period has been required to provide sufficient data to train—i.e., set the variable values for—all the word baseforms.

A lengthy training session is not desirable. Hence, the requirement of generating sufficient data during training to construct multiple baseforms for all words in a vocabulary has been considered a problem to be overcome.

Further, in some instances, baseforms constructed from models of a second set may already exist or may be readily formable as compared to baseforms constructed of models from a first set. Moreover, it may be the baseforms of models selected from the first set—rather than or moreso than the baseforms of second set models—which are needed in the speech recognition scheme. In the past, notwithstanding the ready knowledge of the second set baseforms, the construction of all baseforms of the first set of models required training data to do so.

SUMMARY OF THE INVENTION

It is thus an object of the present invention to provide apparatus and method for synthesizing word baseforms for words not spoken during a training period.

Specifically, the present invention assumes that some known words are each represented by (a) a baseform constructed from word models of a first set and (b) a baseform constructed from word models of a second set. It is also assumed that these two baseforms for the known words can be aligned against each other. It is further assumed that other words are represented initially or are readily represented by baseforms constructed from models of the second set. The present invention teaches apparatus and method for synthesizing baseforms—constructed of models selected from the first set—for such other words after the training period.

That is, from the baseforms generated during training, a correlation is made between models of the first set and each given model of the second set in a given context. Whenever the given model in the given context appears in a "new" word which has not been uttered during training, the piece of the "new" word corresponding thereto is represented by the correlated models of the first set. By representing each piece of a "new" word by correlated models of the first set and concatenating the correlated models for successive pieces of the "new" word, a baseform constructed of models from the first set is synthesized.

The present invention thereby achieves the object of synthesizing some baseforms constructed of models from a first set of models based on baseforms known previously, without necessitating any further training.

The invention also achieves the object of generating different baseforms for the same word without each baseform having to be trained independently.

The invention also features the object of, in some instances, deriving baseforms of models which are preferred for use in speech recognition computations from perhaps less computationally efficient baseforms which may be easier to generate or form.

Moreover, where baseforms of a second set of phonetically-based models are known or are readily determined for words in a vocabulary but where baseforms of models related to acoustic processor outputs provide enhanced recognition accuracy or speed or both, the present invention provides apparatus and method for synthesizing output-related model baseforms for some of the words without requiring training.

BRIEF DESCRIPTION OF THE DRAWINGS

FIG. 11 is an illustration showing the word "CAT" represented phonetically.

FIG. 12 is an illustration of a storage table showing the association between respective fenemic strings and corresponding phonetic models in given contexts.

DESCRIPTION OF A PREFERRED EMBODIMENT

(I) Speech Recognition System Environment

A. General Description

Figure 1:
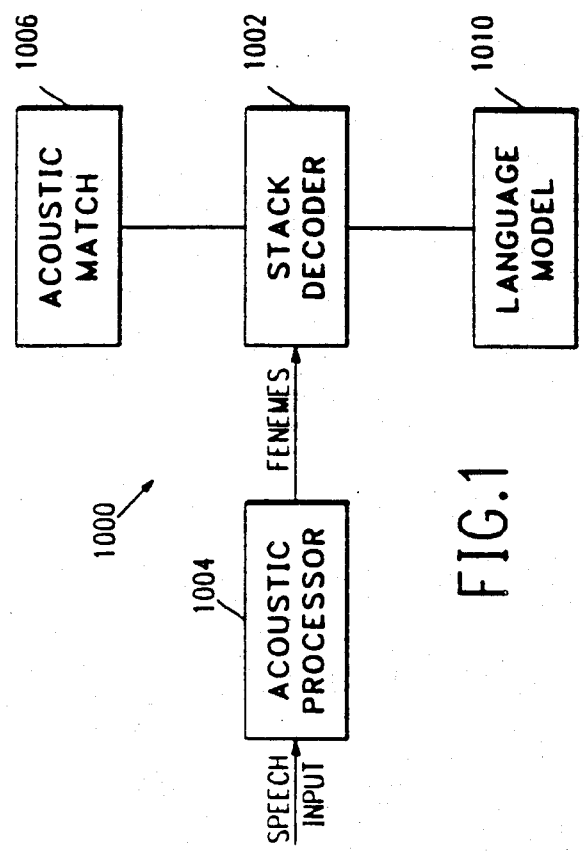
FIG. 1 is an illustration of a speech recognition system in which the present invention may be used.

In FIG. 1, a general block diagram of a speech recognition system 1000 is illustrated. The system 1000 includes a stack decoder 1002 to which are connected an acoustic processor 1004, an acoustic match element 1006 which is preferably an array processor, and a language model processor 1010 which provides a measure of word likelihood based on some preferably contextual criteria. Various articles describe acoustic matching techniques and language models. The following articles, for example, discuss various aspects of speech recognition and modelling techniques and are incorporated herein by reference: "Continuous Speech Recognition by Statistical Methods", *Proceedings of the IEEE*, volume 64, pp. 532-556 (1976) and "A Maximum Likelihood Approach to Continuous Speech Recognition", *IEEE Transactions on Pattern Analysis and Machine Intelligence*, volume PAMI-5, Number 2, Mar. 1983, by L. R. Bahl, F. Jelinek, and R. L. Mercer.

The acoustic processor 1004 is designed to transform a speech waveform input into a string of outputs. According to the processor 1004, speech is characterized by a vector "space" in which vector components correspond to selected features. In the past, such features have included energy amplitudes at different frequencies in the speech spectrum. The acoustic processor 1004 stores a plurality of prototype vectors, each of which has a predefined value for each component. A speech signal input enters the acoustic processor 1004 and is preferably divided into successive time intervals. To each time interval is assigned an output vector based on the values of the various features during such interval. The output vector for each time interval is compared to each prototype vector and a distance measurement is made for each prototype vector. The distance measurement may be made by a conventional vector distance measurement technique. Each time interval is then associated with a particular prototype vector or some other output-related function.

For example, each prototype vector may be identified by a label or symbol, referred to as a "feneme". In such case, the acoustic processor 1004 puts out a feneme for every time interval. Hence, for a speech input, the acoustic generator 1004 generates a string of fenemes. Preferably, there are on the order of 200 different fenemes (or labels) in an alphabet. For each interval, then, one of the 200 fenemes is selected.

A description of a specific type of acoustic processor is set forth in a co-pending patent application entitled "Nonlinear Signal Processing in a Speech Recognition System", Ser. No. 665401 filed on Oct. 26, 1984, which is incorporated by reference herein to the extent necessary for complete disclosure. In this co-pending application, the features selected for the vector components are derived from a unique model of the human ear. Each vector component corresponds to a presumed neural firing rate for a respective frequency band.

The fenemes from the acoustic processor 1004 enter the stack decoder 1002. The stack decoder 1002, in sum, defines one or more likely word paths and extends each likely word path by a likely next word. Both the likely word path(s) and likely next words are determined in part based on the labels generated by the acoustic processor 1004. One novel type of stack decoder is disclosed in a co-pending patent application entitled "A Decoding Method for Speech Recognition", Ser. No. 738911 filed by IBM Corporation on May 29, 1985. This co-pending application is incorporated herein by reference to the extent required for adequate disclosure.

In determining a next likely word, or more specifically a list of candidate words which have a relatively high likelihood of being next along a path, fenemes from the acoustic processor 1004 are directed to an acoustic matching element 1006. Various types of acoustic matching are described in the co-pending patent application entitled "Apparatus and Method for Performing Acoustic Matching", Ser. No. 672974 filed by the IBM Corporation on Nov. 19, 1984 and incorporated herein by reference to the extent required for adequate disclosure.

The acoustic matching element 1006 operates based on word models. Specifically, as discussed in the application referenced immediately hereinbefore, acoustic matching is performed by characterizing words as respective sequences of probabilistic finite state machines, also referred to as Markov models.

In general, there is a set of Markov models wherein each Markov model corresponds to a respective sound category. For example, each Markov model may correspond to an element in the International Phonetic Alphabet. The phonetic character AA0 would have a phonetic Markov model corresponding thereto, as would AE0, AE1, and so on through ZX.

When employing phonetic Markov models, each word is initially defined by a sequence of phonetic elements. By concatenating the phonetic models corresponding to the phonetic elements in the word, a phonetic word baseform is constructed.

Figure 2:
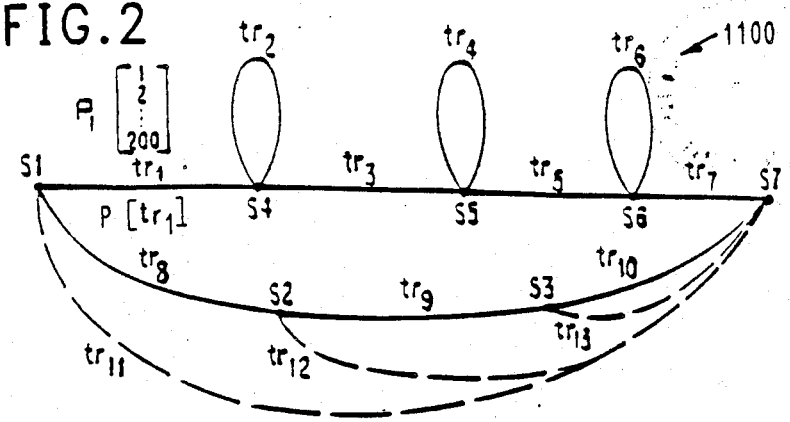
FIG. 2 is an illustration depicting a phonetic Markov model.

Each phonetic Markov model is preferably represented by a structure as shown in FIG. 2. Specifically, the phonetic Markov model of FIG. 2 includes (a) seven states S1 through S7; (b) thirteen transitions tr1 through tr13; (c) a probability for each transition p[tr1]through p[tr13](note that only p[tr1]is shown in the figure); and (d) label output probabilities at transitions tr1 through tr10. Each label output probability corresponds to the likelihood of a given label being produced at a given transition of the phonetic Markov model, as determined during a training session. That is, based on the utterance of a known text (which should correspond to a sequence of prescribed phonetic elements), the likelihood of label 1 being produced at transition tr1 for a specific phonetic model (e.g. for example, the phonetic model for AA0) is determined and identified as $p_1[1]$. The likelihood of label 200 being produced at transition tr3 is also determined and is identified as $p_3[200]$. Similarly, based on training data, label output probabilities for each label at each transition tr1 through tr10 for each phonetic model are determined and identified.

Transitions tr11 through tr13, it is noted, are null transitions. No label can be produced at a null transition; hence there are no label output probabilities assigned thereto.

Transition probabilities for all transitions tr1 through tr13 are also derived from data generated during training and by applying the well-known, forward-backward algorithm.

Figure 3:
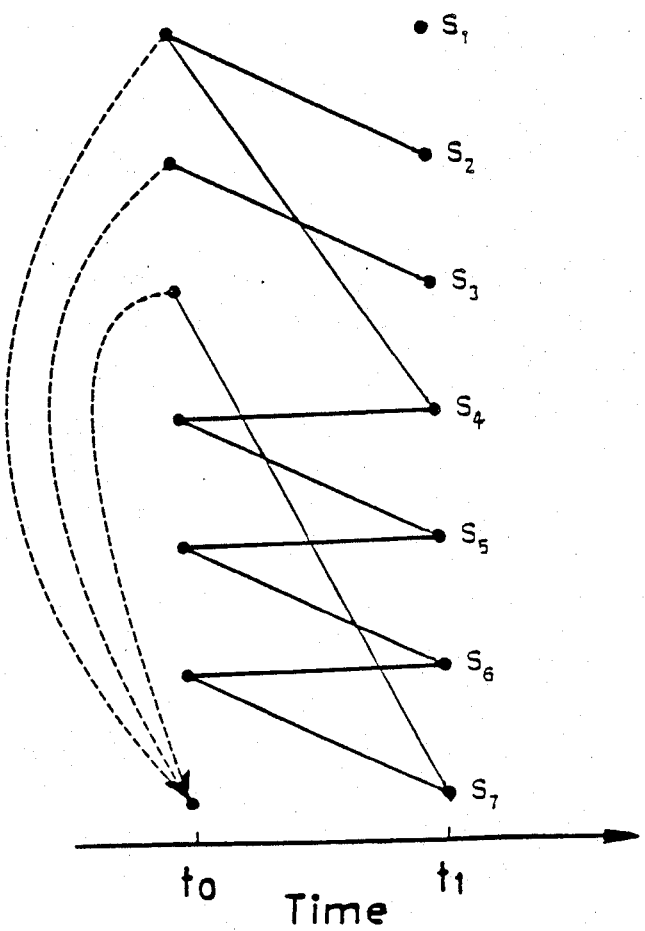
FIG. 3 is an illustration depicting a lattice or trellis structure showing a label interval for the phonetic Markov model of FIG. 2.

By way of brief explanation, FIG. 2 depicts a phonetic element such as AA0 and suggests a number of ways that the utterance of the AA0 sound may proceed from state S1 to state S7. If transition tr11 is followed, the AA0 phonetic element will not produce any label. Alternatively, a route may be followed from state S1 to state S2 or state S4; a label being produced if either of these two routes is taken. These alternative routes are shown in FIG. 3.

In FIG. 2, the horizontal axis represents a time interval during which a label is generated; the solid lines show transitions that may occur in the model during a label interval; and the dashed lines show null transitions that may be followed.

Figure 4:
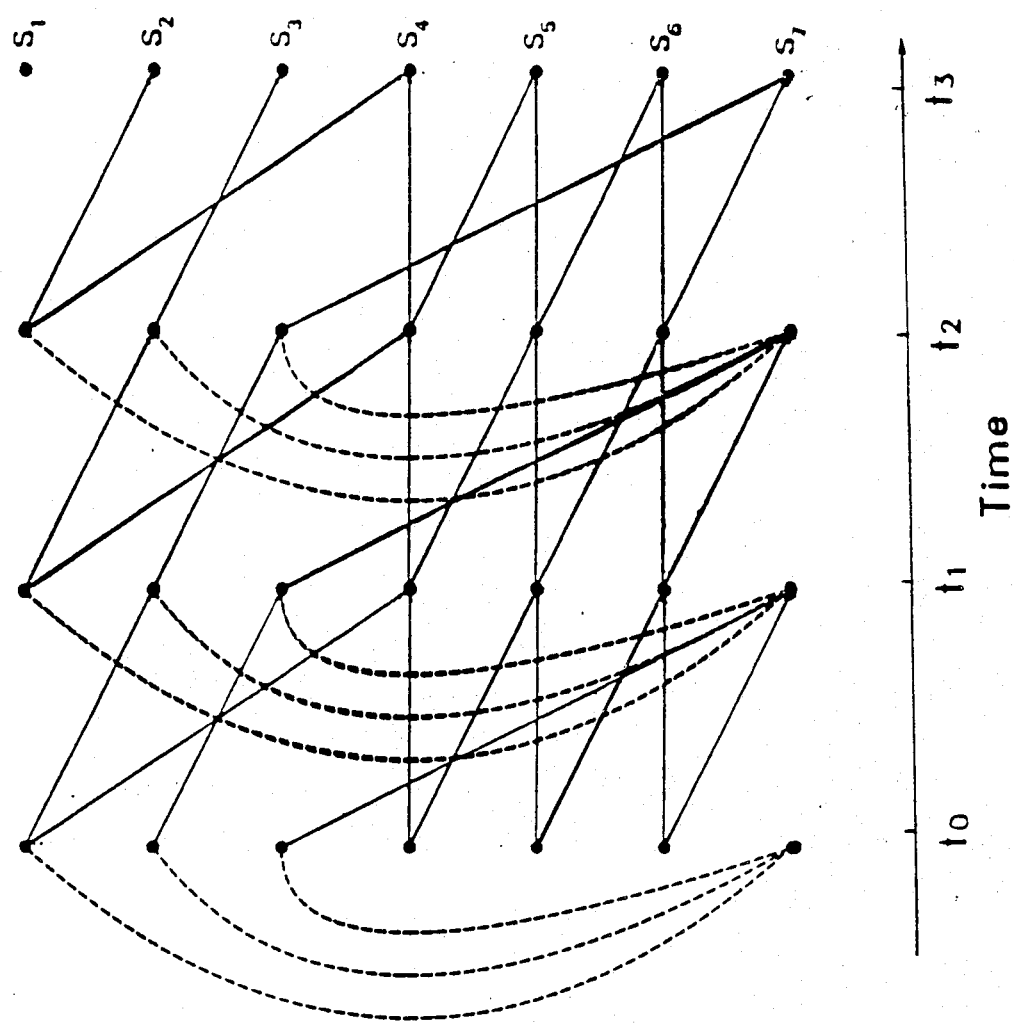
FIG. 4 is an illustration depicting a lattice or trellis structure as in FIG. 3 measured over several label output intervals starting with the first label in a string of labels generated by an acoustic processor.

FIG. 4 shows a lattice which depicts a Markov phone model at successive label intervals referenced from a start time $t_0$. Time $T_0$ corresponds to the time at which a first label in a string is generated by an acoustic processor 1004. Letting time $T_0$ correspond to the state S1, by way of example, various routes to the final state S7 are illustrated. In one route, state S1 leads to state S2 which leads to state S3—two non-null transitions being followed. From state S3, one route to state S7 results in no label being produced whereas a second route follows a non-null transition. It is observed that for a sequence of labels, various routes along transitions of one or more phonetic models may be followed.

Figure 5:
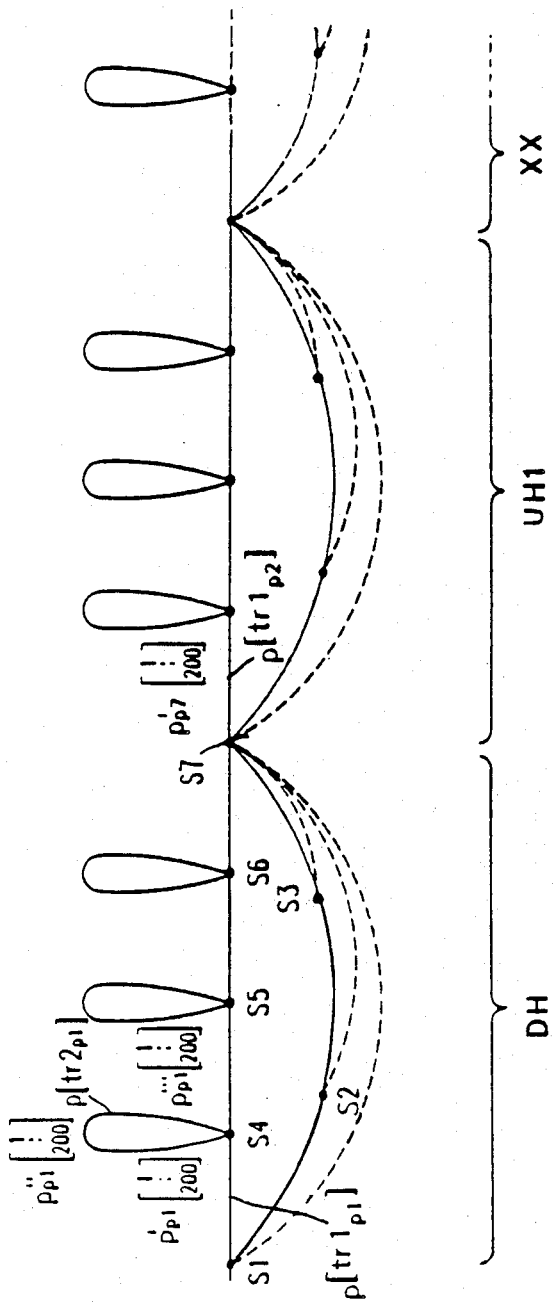
FIG. 5 in part (a) is an illustration of the phonetic representation of one pronunciation of the word "THE" and part (b) shows three concatenated phonetic Markov models forming a phonetic baseform of the word "THE".

A phonetic Markov word model is shown in FIG. 5. In FIG. 5(a), the word "THE"—according to one pronunciation thereof—is illustrated as three phonetic elements in sequence. The phonetic elements are DH, UH1, and XX. In FIG. 5(b), the phonetic Markov models for DH, UH1, and XX are concatenated to form the phonetic word baseform for the word "THE".

A lattice—such as that of FIG. 4—may be extended to include all of the labels generated in response to some speech input (e.g., the word "THE"). In the extended lattice, it is noted that the transitions from state to state have probabilities assigned thereto and that the label output probabilities are also assigned to the transitions.

The process of evaluating word likelihood includes determining which word model has the highest likelihood of producing the labels generated (by the acoustic processor 1004 in response to a speech input) at times $t_0$, $t_1$, and so on. A detailed description of how acoustic matching is employed in determining word likelihood is set forth in the co-pending application on acoustic matching.

In addition to phonetic models which are used in constructing phonetic baseforms, fenemic Markov models have also been used in acoustic matching. Specifically, instead of employing the relatively complicated phonetic models such as that of FIG. 2, a set of Markov models based on fenemes have been employed.

Figure 6:
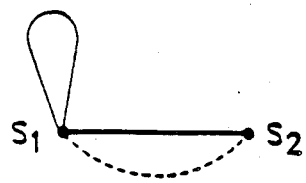
FIG. 6 is an illustration of a fenemic Markov model.
Figure 7:
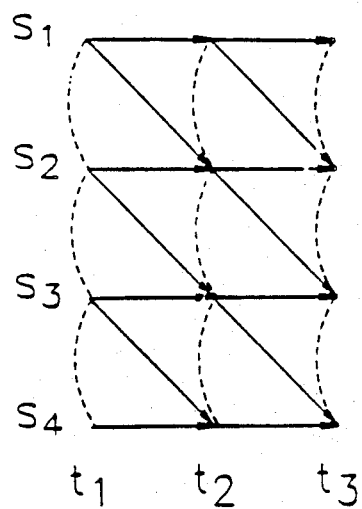
FIG. 7 is an illustration depicting a lattice or trellis structure for several label output intervals corresponding to fenemic Markov models.
Figure 8:
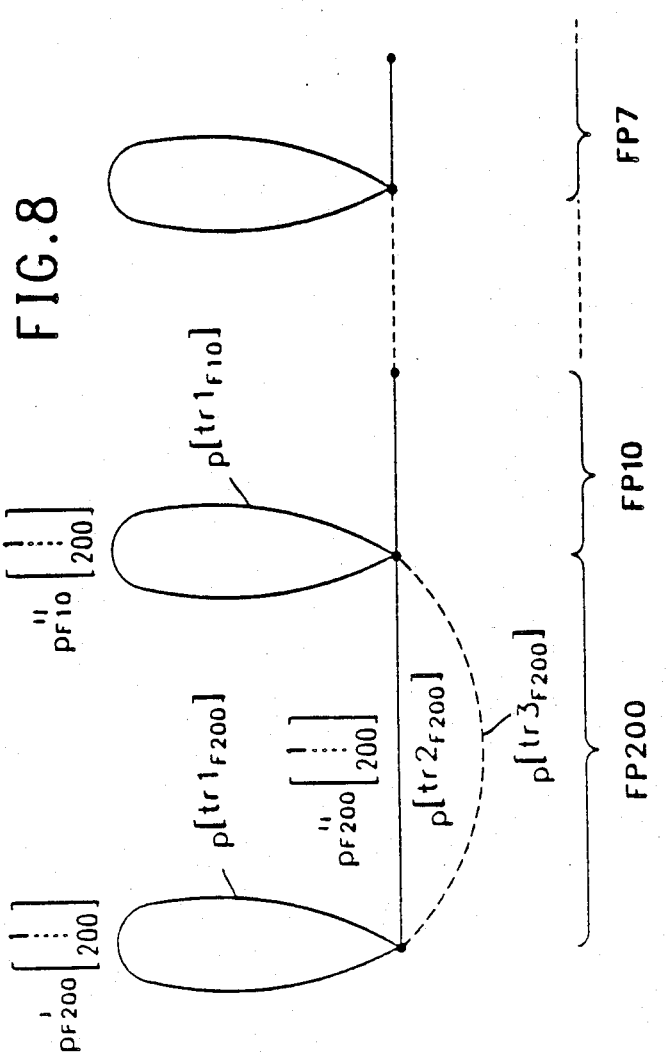
FIG. 8 is an illustration showing fenemic Markov models concatenated in forming a word.

A fenemic Markov model is set forth in FIG. 6. It is observed that the fenemic Markov model has a simple structure including two states S1 and S2 and three transitions. One non-null transition extends from S1 to S2, a second non-null transition forms a self-loop extending from state S1 back to itself, and a null transition extends from state S1 to state S2. Each of the three transitions has a probability assigned thereto and, for each of the two non-null transition, there are label output probabilities derived from data generated during a training session. A lattice based on fenemic models is depicted in FIG. 7. In FIG. 8, a plurality of fenemic Markov models are concatenated as they would be in forming a fenemic word baseform.

The notation in FIG. 8 is briefly discussed. FP200 refers to a fenemic phone that corresponds to the 200th feneme in the fenemic alphabet which typically includes 200 distinct fenemes. FP10 similarly corresponds to the 10th feneme in the fenemic alphabet. Concatenating FP200, FP10, and so on forms a fenemic word baseform. Each feneme lasting typically 1 centisecond, a normal spoken word averages 80 to 100 fenemes in length. Moreover, because each fenemic model produces on average about one feneme, the typical fenemic baseform is approximately 80 to 100 fenemic models in length. The probability for the second transition of FP200 is identified as $p[tr_{200}]$. The probability of the model for FP200 producing the label 1 at the second transition of the FP200 model is identified as $p"_{F200}[1]$. The FP200 model may in fact be skewed toward producing the 200th feneme; however, due to variations in pronunciations, the FP200 model also has probabilities of producing other fenemes also.

The following two sections outline methodology for constructing word baseforms constructed on phonetic Markov models and fenemic Markov models respectively. In reviewing the two types of baseforms, it is observed that the phonetic baseforms normally include fewer concatenated models, however the calculations required by the phonetic models are significantly greater than those required by fenemic models. Also, phonetic baseforms are formulated by phoneticians, whereas fenemic baseforms have been constructed automatically without the need for phonetician input, as noted in the patent applications cited in Section (I)(C).

B. Constructing Phonetic Baseforms

For each word, there is a sequence of phonetic sounds each having a respective phonetic model (referred to also as a phonetic "phone" machine) corresponding thereto. Preferably, at each non-null transition there is some probability associated with producing each feneme. (A feneme alphabet is shown in Table 1.) Transition probabilities and feneme probabilities in the various phonetic phone machines are determined during training by noting the feneme string(s) generated when a known phonetic sound is uttered at least once and by applying the well-known forward-backward algorithm.

A sample of statistics for one phone identified as phone DH are set forth in Table 2. As an approximation, the label output probability distribution for transitions tr1, tr2, and tr8 of the phone machine of FIG. 2 are represented by a single distribution; transitions tr3, tr4, tr5, and tr9 are represented by a single distribution; and transitions tr6, tr7, and tr10 are represented by a single distribution. This is shown in Table 2 by the manner of assignment of arcs (i.e., transitions) to the respective columns 4, 5, or 6. Table 2 shows the probability of each transition and the probability of a label (i.e., feneme) being generated in the beginning, middle, or end, respectively, of the phonetic element (or "phone") DH. For the DH phone, for example, the probability of the transition from state $S_1$ to state $S_2$ is counted as 0.07243. The probability of transition from state $S_1$ to state $S_4$ is 0.92757. (In that these are the only two possible transitions from the initial state, their sum equals unity.) As to label output probabilities, the DH phone has a 0.091 probability of producing the feneme AE13 (see Table 1) at the end portion of the phone, i.e. column 6 of Table 2. Also in Table 2 there is a count associated with each node (or state). The node count is indicative of the number of times during the training that the phone was in the corresponding state. Statistics as in Table 2 are found for each phonetic model, or phonetic phone machine.

The arranging of phonetic phone machines into a word baseform sequence is typically performed by a phonetician and is normally not done automatically.

C. Constructing Fenemic Baseforms

The probabilities associated with each transition and with each label at a transition of a fenemic model as depicted in FIG. 6 are determined during a training session in a manner similar to the training of phonetic models in phonetic-type baseforms.

Fenemic word baseforms are constructed by concatenating fenemic phones. One approach is described in a copending application entitled "Feneme-based Markov Models for Words" (Ser. No. 697,174 filed Feb. 1, 1985). Preferably, the fenemic word baseforms are grown from multiple utterances of the corresponding word. This is described in a co-pending and commonly assigned application entitled "Constructing Markov Models of Words from Multiple Utterances", (Ser. No. 738,933 filed May 29, 1985), which is incorporated herein by reference to the extent required for adequate disclosure of the present invention. Briefly, one method of growing baseforms from multiple utterances includes the steps of:

(a) transforming multiple utterances of the word segment into respective strings of fenemes;
(b) defining a set of fenemic Markov model phone machines;
(c) determining the best single phone machine $P_1$ for producing the multiple feneme strings;
d) determining the best two phone baseform of the form $P_1P_2$ or $P_2P_1$ for producing the ultiple feneme strings;
(e) align the best two phone baseform against each feneme string;
(f) splitting each feneme string into a left portion and a right portion with the left portion corresponding to the first phone machine of the two phone baseform and the right portion corresponding to the second phone machine of the two phone baseform;
(g) identifying each left portion as a left substring and each right portion as a right substring;
(h) processing the set of left substrings in the same manner as the set of feneme strings corresponding to the multiple utterances including the further step of inhibiting further splitting of a substring when the single phone baseform thereof has a higher probability of producing the substring than does the best two phone baseform;
(j) processing the set of right substrings in the same manner as the set of feneme strings corresponding to the multiple utterances, including the further step of inhibiting further splitting of a substring when the single phone baseform thereof has a higher probability of producing the substring than does the best two phone baseform; and
(k) concatenating the unsplit single phones in an order corresponding the order of the feneme substrings to which they correspond.

The baseform models are trained (or filled with statistics) by speaking known utterances into an acoustic processor that generates a string of labels in response thereto. Based on the known utterances and the generated labels, the statistics for the word models are derived according to the well-known forward-backward algorithm discussed in articles referred to hereinabove.

In FIG. 7 a lattice corresponding to fenemic phones is illustrated. The lattice is significantly simpler than the lattice of FIG. 4 relating to a phonetic model scheme.

Either phonetic baseforms or fenemic baseforms may be used in acoustic matching or for other speech recognition purposes.

D. Training Word Models

A preferred method of training is taught in the co-pending application—incorporated herein by reference —"Improving the Training of Markov Models Used in a Speech Recognition System," invented by L. R. Bahl, P. F. Brown, P. V. DeSouza, and R. L. Mercer and assigned to the IBM Corporation. Therein training entails determining statistics for each word baseform in a manner which enhances the probability of the correct word relative to the probabilities associated with other words. The philosophy is to maximize the difference between the probability of the correct script of uttered words given the label outputs and the probability of any other (incorrect) script, rather than maximizing the probability of the labels given the script as in other approaches.

Such methodology provides—in a system for decoding a vocabulary word from outputs selected from an alphabet of outputs in response to a communicated speech input wherein each word in the vocabulary is represented by a baseform of at least one probabilistic finite state model and wherein each probabilistic finite state model has transition probability items and output probability items and wherein a value is stored for each of at least some probability items—a method of determining probability item values comprising the step of biassing at least some of the stored values to enhance the likelihood that outputs generated in response to communication of a known word input are produced by the baseform for the known word relative to the respective likelihood of the generated outputs being produced by the baseform for at least one other word.

Each word (or distinct pronunciation of a word which is referred to as a "lexeme") is preferably represented by one or more probabilistic finite state machine (or model) in sequence. Each machine corresponds to a "phone" from a set of phones. Each phone correlates to a phonetic element, a label (or feneme), or some other predefined characterization of speech for which a Markov model of the like can be specified.

The training script is typically composed of a series of known words.

In accordance with the presently described training methodology, probability values associated with the probability items are evaluated as follows.

For each probability item, there is a set estimate value $\theta'$. Given the estimated values $\theta'$ and the labels generated during training, values referred to as "single counts" are determined. A "single count" in general relates to the (expected) number of times an event occurs based on training data. One specific definition of a "single count" is the probability of a particular transition $T_i$ and state $S_j$ given (a) a certain string Y of labels, (b) defined estimated values $\theta'$, and (c) a particular time, t.

The above-described single counts are determined by applying the well-known forward-backward algorithm, or Baum-Welch algorithm.

According to the above definition, the single count may be represented by the expression:

$Pr(S_j, \tau_i | Y, \theta, t)$

By summing the single counts for a specific $S_j, \tau_i, Y, \theta'$ for each time t, a "transition cumulative count" is determined for a corresponding transition probability item. Because the transition cumulative count is a sum of probabilities, its value may exceed unity. For each transition probability item, a respective transition probability item is preferably stored. By dividing this cumulative count from a given transition by the sum of cumulative counts for all transitions which can be taken from state $S_j$, a current probability value for the respective transition probability item is determined. The current probability value is preferably stored and associated with its respective transition probability item.

With regard to label output probability items, single counts are again summed. For each of these probability items, a sum is made of the single counts for a specific $S_j, \tau_i, Y$, and $\theta'$, for all label times at which the corresponding generated label in the string is the label corresponding to the label output probability item. The sum in this case is a "label output cumulative count" and is preferably stored associated with the label output probability item corresponding therewith. By dividing this cumulative count by the sum of single counts over all label times for the specific $S_j$, f, $T_i, Y$, and $\theta'$, a current probability value is determined for the respective label output probability item.

In accordance with the methodology of the above-cited patent application, a training script of uttered known words, an initial probability value for each probability item, and a list of candidate words for each word uttered during training are prescribed. The list of candidate words is defined by a procedure such as the fast approximate acoustic match. For any known uttered word there is the "correct" known word and an "incorrect" word (preferably the incorrect word having the highest likelihood of being wrongly decoded as the known word).

Current probability values of the probability items are determined by first computing a "plus count value" and a "minus count value" for each probability item in the correct word baseform or incorrect word baseform. The plus count value is added to, and then the minus count value is subtracted from, the cumulative count for the corresponding probability item (for each probability item).

A plus count value is computed for each probability item in the word baseform of the correct (i.e. known) word by applying the well-known forward-backward algorithm and preferably scaling the statistics resulting therefrom. The adding of the plus count value biasses the count values (and probability items derived therefrom) in favor of the string Y, making Y appear to be a relatively more likely output of the correct word model.

The minus count value for a given probability item is computed by applying the forward-backward algorithm as if the incorrect word was spoken to produce the string of labels. The minus count value derived from the single utterance of the known word is subtracted from the most recent value of the corresponding cumulative count (before or after summation with the plus count value). This subtraction biasses a cumulative count used in computing a probability item in the incorrect word baseform away from the string Y.

Based on these adjusted cumulative counts, the probability values for counts and probability values are adjusted to enhance decoding accuracy.

By following the above steps for each word in the vocabulary, the stored values for counts and probability values are adjusted to enhance decoding accuracy.

The above-discussed methodology serves to improve count values which are determined by other techniques in order to improve the decoding of speech into recognized words in a vocabulary.

(II) Synthesizing Baseforms for Unuttered Words

Figure 9:
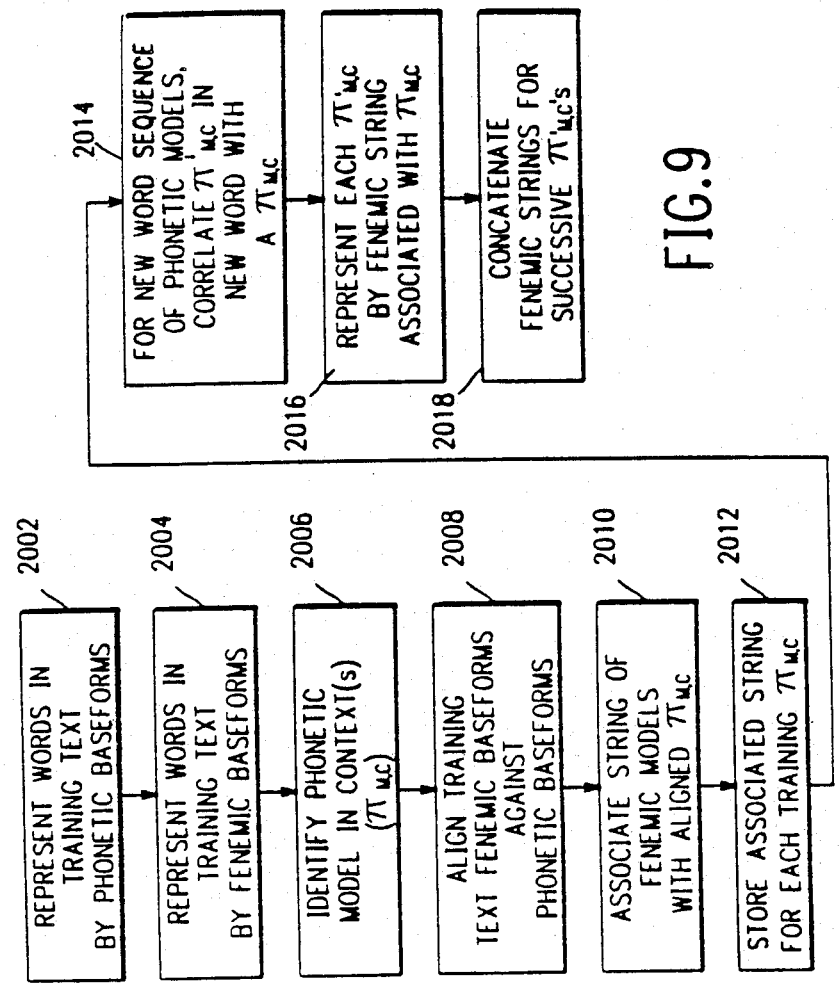
FIG. 9 is a diagram showing in general the methodology of the present invention.

Referring to FIG. 9, diagram 2000 illustrates the general methodology of the present invention. At step 2002, words in a training text are represented by phonetic baseforms. In particular, each word to be uttered during a training session is characterized, normally by a phonetician, as a sequence of phonetic elements as defined by the International Phonetic Alphabet. Each phonetic element is represented by a corresponding phonetic model; hence, for each word there is a corresponding sequence of phonetic models as described hereinbefore in Section (I)(B). The sequence represents a phonetic baseform.

As described hereinabove in Section (I)(C), words can also be represented by fenemic baseforms constructed of a series of fenemic models. In step 2004, words in the training text are represented by fenemic baseforms.

Fenemes, it is observed, are "output-related". That is, fenemes are outputs generated by an acoustic processor, such as processor 1004. Accordingly, fenemic models are "output-related models". In this regard, it should further be noted that other output-related models may be alternatively employed. For example, "output-related models" may alternatively be defined based on simply output vectors or other selectable characteristic outputs of speech that an acoustic processor may provide as output.

The phonetic models occurring during the training text occur in various phonetic model contexts. In the presently described embodiment, "phonetic model context" is defined by the phonetic model immediately preceding and the phonetic model immediately succeeding a subject phonetic model. That is, for a sequence of phones, the context of a subject phonetic model at position $P_i$ is determined by the phonetic models at positions $P_{(i-1)}$ and $P_{(i+1)}$. A particular subject phonetic model 9 may occur in any of a plurality of contexts. Assuming that there are 70 phonetic elements in the phonetic element set—which, for purposes of discussion in this application, includes an element corresponding to silence—it is considered possible for any (non-silence) phonetic model to be produced by any of the 70 phonetic models and succeeded by any of the 70 phonetic models. For a given phonetic model, there are thus $70 \times 70 = 4900$ possible contexts.

According to one embodiment of the invention, each of the numerous possible contexts for each phonetic model is allocated a position in storage.

In a preferred embodiment disclosed hereinbelow, however, only selected contexts are entered into storage. In either case, for an mth phonetic model $\pi_m$ of the set of phonetic models, a plurality of contexts may be identified. In storage, the phonetic model and its context are noted as $\pi_{m,c}$ in step 2006.

Preferably, for all words uttered in the training text, there is a fenemic word baseform and a phonetic word baseform. In step 2008, the well-known Viterbi alignment procedure is applied. That is, each of successive phonetic models in the phonetic baseform of a given word is correlated with a corresponding string of fenemic models in the fenemic baseform of the given word. Viterbi alignment is described in detail in the abovenoted article by F. Jelinek.

If a phonetic model in a given context is uttered only one time, there will be one string of fenemic models aligned thereagainst. However, as preferred in the present embodiment, if a phonetic model in a given context is uttered several times during the training session, it is likely that differing strings of fenemic models will be aligned against the same phonetic model. The differing strings corresponding tot he utterance of the same phonetic model in the same context is due to differing pronunciations. That is, the different pronunciations are interpreted by the acoustic processor 1004 (of FIG. 1) so as to generate different label outputs (i.e., fenemes) and, hence, different strings of fenemes.

To account for the different feneme strings resulting from multiple utterances, an average or composite fenemic baseform is constructed. Methodology for constructing a composite fenemic model string from multiple utterances is readily noted from Section (I)(D) and the latter patent application cited therein.

Whether there are one or more utterances of a contexted phonetic model ($\pi_{m,c}$), a respective string of fenemic models is associated with $\pi_{m,c}$. The association of feneme strings with respective phonetic models is context ($\pi_{m,c}$) is performed in step 2010.

As noted hereinabove, if each phonetic model is uttered in every possible context, each phonetic model would have 4900 entries stored therefor. For 70 phonetic models this would result in 4900×70=343000 entries in storage. As noted hereinbelow, this large number of entries results in increased time required for training which, in normal speech recognition environments, is not desirable.

The preferred mode thus does not provide a fenemic model string associated with each possible context but, instead, for only some of the 343000 possible contextual combinations. Only these selected contexts are uttered during the training session and only fenemic model strings therefor are associated therewith. The fenemic model strings associated with respective contexted phonetic models ($\pi_{m,c}$) are stored as table entries (see step 2012).

To construct fenemic baseforms for "new" words which have not been uttered during the training session, steps 2014, 2016, and 2018 are performed. In step 2014, the new word is represented as a sequence of phonetic models each in a defined context. Each new word phonetic model ($\pi'_{m,c}$) is then correlated with a contexted phonetic model ($\pi_{m,c}$) that has been stored. If all 343000 context combinations have stored entries, there is a one-to-one correlation. If there are only selected stored entries, the correlation of step 2014 is a close match process as discussed in greater detail hereinbelow.

In step 2016, each new word phonetic model ($\pi'_{m,c}$) is represented by the feneme string associated with the correlated phonetic model $\pi_{m,c}$.

Following the above procedure for each new word phonetic model ($\pi_{m,c}$), the various resulting fenemic strings are concatenated in step 2018 to provide a fenemic word baseform of the new word.

Figure 10:
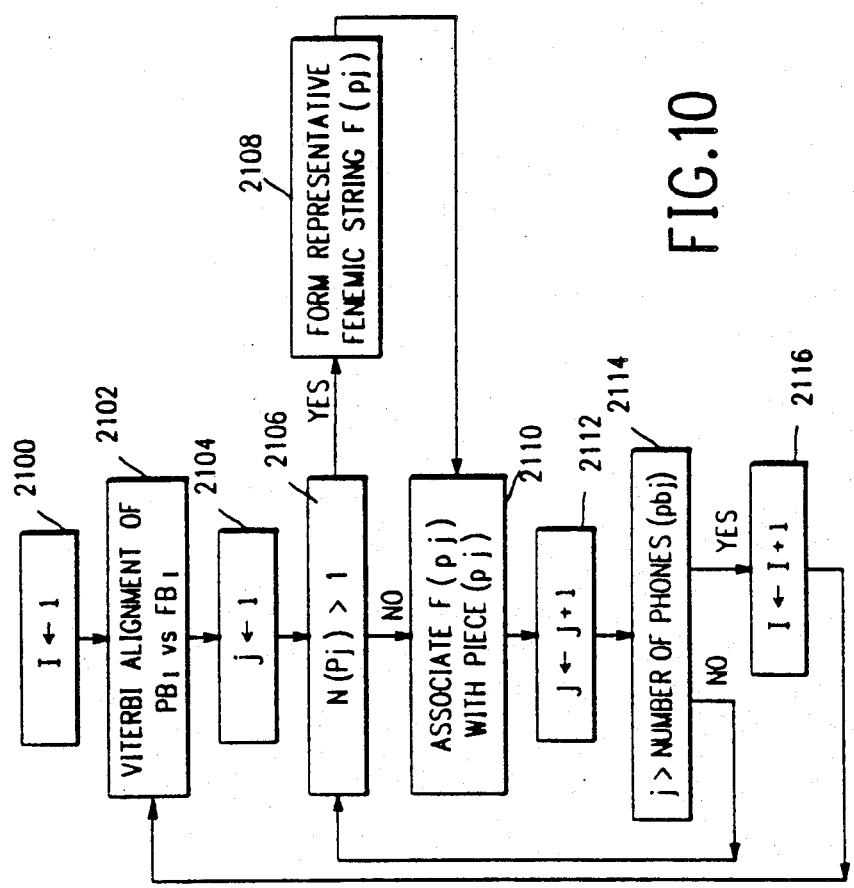
FIG. 10 is a flowchart illustrating how fenemic baseforms are divided into pieces corresponding in size to phonetic elements.

A specific method for breaking up fenemic baseforms into phonetic element-sized pieces (as required by the steps of FIG. 9) is set forth in FIG. 10. In FIG. 10, a first word (I←1) is considered (step 2100). A phonetic baseform $PB_I$ is known for the first word and, during training, one or more fenemic baseforms $FB_I$ are generated. The well-known Viterbi alignment is applied to the phonetic baseform with respect to each fenemic baseform for the first word (step 2102). In step 2104, the first phonetic element is considered, j←1. If there is more than one fenemic baseform for the word, step 2106 requires that a single representative string of fenemes for the jth phonetic element be determined (see step 2108). Whether formed from one or more fenemic baseforms, the piece of the word ($p_j$) corresponding to the jth phonetic element has associated therewith a string of fenemes $F(p_j)$. $F(p_j)$ is preferably represented by a number or other identifier that corresponds to a respective fenemic model string. This is performed in step 2110. The value of j is incremented in step 2112. If j exceeds the number of phonetic elements in the phonetic baseform (step 2114), the next word is selected in accordance with step 2116 and the procedure starts again at step 2102. If j does not exceed the number of phonetic elements, steps 2106 through 2114 are repeated for the next phonetic element in the phonetic baseform.

FIG. 11 shows a sample word "CAT" represented as a sequence of phonetic elements which represent symbols from the standard International Phonetic Alphabet in computer readable form. For purposes of this disclosure, it is assumed that the word "CAT" is not uttered during the training period and that a fenemic baseform for "CAT" is sought. Hereinbelow is a discussion of how the fenemic baseform for the word "CAT" is synthesized in accordance with the present invention.

For each phonetic element in the word "CAT", there is a corresponding phonetic model—such as the model set forth in FIG. 2. The probabilities assigned to the various transitions and label outputs are derived from statistics generated during the training session as outlined in section (I)(D).

FIG. 12 shows selected portions of a storage table having four columns. In the first column is a subject phonetic element identified as $\pi_m$ where m is 1 through 70 (in a 70 phonetic element alphabet). For each phonetic element, there are a plurality of identified contexts. In the present embodiment, the context of a phonetic element in position $P_i$ is based on the phonetic element in the preceding position $P_{(i-1)}$ and the phonetic element in the next succeeding position $P_{(i+1)}$. In the second column are stored phonetic elements which precede the subject phonetic element. In the third column are stored phonetic elements which succeed the subject phonetic element.

Taking the AE1 phonetic element of "CAT", a first context may be identified as AA0-AE1-AA0. In this case, AE1 is preceded and followed by the first phonetic element of the fenemic alphabet. A second context is shown as AA0-AE1-AE0; AE1 preceded by the first phonetic element and succeeded by the second phonetic element. After the various contexts which include AA0 as the preceding phonetic element are listed, the contexts which include AE0 as the preceding phonetic element are listed. The listing includes various three-element combinations with AE1 as the subject (middle) phonetic element.

Examining the list entries for the phonetic element corresponding to AE1, one context $\pi_{m,c}$—enclosed by a dashed line—has KQ as the preceding phonetic element and TX as the next succeeding phonetic element. This context corresponds to the context found in the word "CAT". Based on data obtained during training, the KQ-AE1-TX context has an associated feneme string identified as f. As noted hereinabove, the string f may be the result of a single utterance or multiple utterances of the KQ-AE1-TX context during training. The string f corresponds to the AE1 phonetic element occurring in the KQ-AE1-TX context.

In forming a fenemic baseform for the word "CAT", the f string is associated with that piece of the word "CAT" that corresponds to the AE1 phonetic element.

For the other phonetic elements in the word "CAT", a corresponding fenemic model string is derived. That is, the fenemic model string associated with SILENCE-KQ-AE1 is noted; the fenemic model string for TX flanked by AE1 and TQ is noted; and so on. The various fenemic model strings derived for the phonetic elements in the word "CAT" are concatenated in the order in which their respective phonetic elements occur in the word. The concatenated fenemic model strings form the fenemic baseform synthesized for the word "CAT".

In this preferred embodiment, a phonetic element may occur in a context in a "new" word that does not have a fenemic model string associated therewith in storage. To permit use of an abbreviated correspondence list between fenemic model strings and three-element phonetic contexts, the methodology of FIG. 13 is employed.

Figure 13:
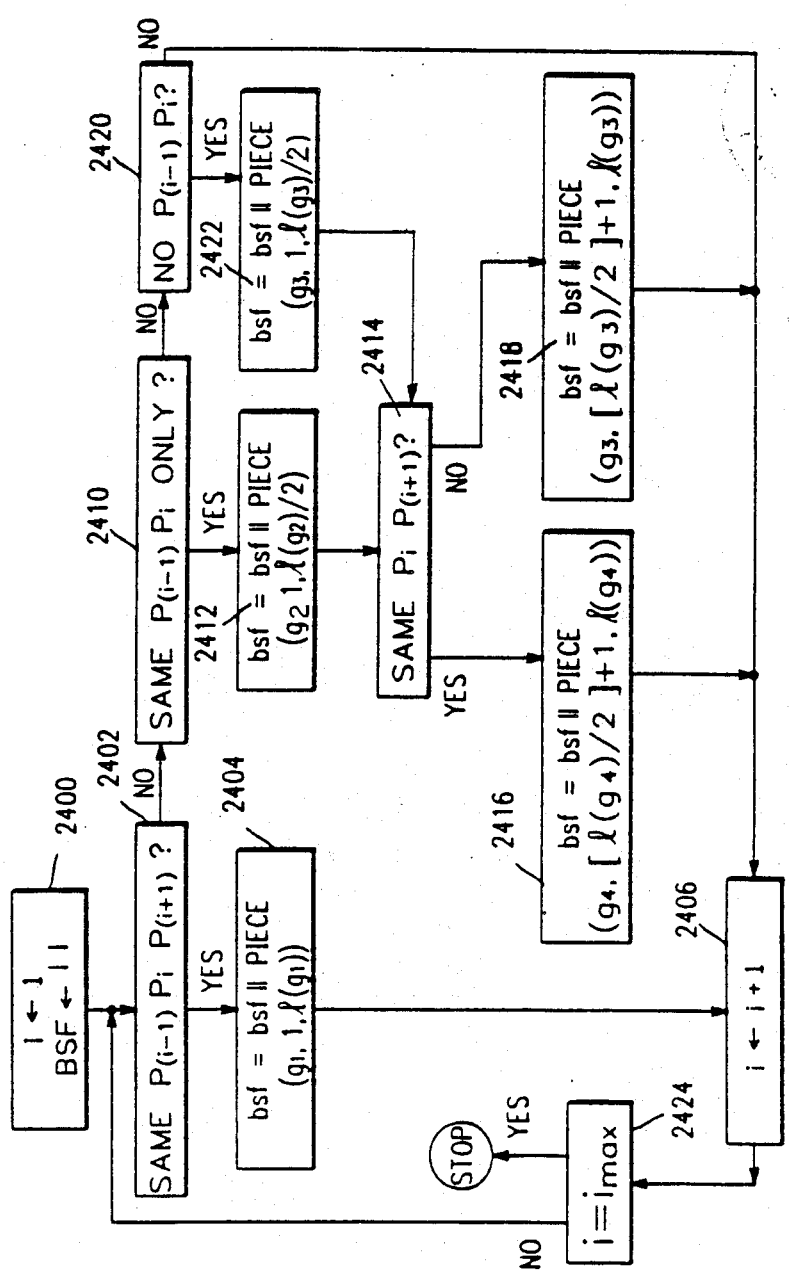
FIG. 13 is a flowchart depicting the synthesis of fenemic baseforms where the list of FIG.12 includes some but not all possible phonetic contexts.

According to FIG. 13, each "new" word is represented as a sequence of phonetic elements, each phonetic element representing a piece of the "new" word. The phonetic element corresponding to each word piece is then identified in its context $\pi'_{m,c}$. Starting with the first word piece i←1 in step 2400, a decision is made at step 2402 as to whether $\pi'_{m,c}$—at position $P_i$—corresponds entirely to a contexted phonetic element ($\pi_{m,c}$) having an associated fenemic model string. If yes, the associated fenemic model string in its entirety is to be included in the fenemic baseform in step 2404.

The notation employed in step 2404 (and in other steps discussed hereinafter) warrants a brief explanation. The double vertical lines represent a concatenation operator, in which the "piece" to the right thereof is tagged on to that portion of the baseform previously constructed. The "piece" to the right of the concatenation operator includes three parameters: the leftmost parameter refers to the decision being made; the next parameter indicates the starting fenemic model in the associated fenemic model string; and the last parameter indicates the last fenemic model in the associated fenemic model string which is to be included in the concatenation. "piece($g_1$,1,l($g_1$))" thus refers to the first through last fenemic models associated with the $g_1$ decision (of step 2402). That is, a $g_1$ "yes" decision indicates that the "new" word subject phonetic element $\pi'_{m,c}$ corresponds to a stored $\pi_{m,c}$ (with the same three-element phonetic context) and that there is a fenemic model string—starting with model 1 and ending with model $\pi(g_1)$—associated therewith. In accordance with step 2404, a yes $g_1$ decision results in the entire fenemic model string being tagged onto the baseform constructed for previous pieces of the "new" word. After step 2404, the next word piece is examined in accordance with step 2406.

In the event that a phonetic element $\pi_{m,c}$ in a "new" word does not map to a phonetic element in storage which has the same three-element phonetic context, a decision is made as to whether there are similar two-element phonetic contexts. In step 2410, a "new" word phonetic element and the phonetic element preceding it are considered in a decision referred to as $g_2$. If a similar preceding element-subject element context is included in any three-element context occurring in the storage list, the fenemic model string therefor is retrieved. The first half of the fenemic model string is then extracted in step 2412 to be concatenated onto the fenemic baseform(bsf) which is being constructed.

A similar examination is performed to determine if the subject phonetic element and the phonetic element which trails it have a counterpart context in storage. This is performed in step 2414, referred to as a $g_4$ decision.

This decision indicates whether there is a three-element context in the list in which the last two phonetic elements are the same as the subject phonetic element and trailing element in the "new" word piece being considered. If so, the second half of the fenemic model string (with the first fenemic model thereof omitted) is tagged onto the baseform (bsf) being constructed (see step 2416). If not, step 2418 provides that the latter part of a fenemic string determined according to step 2420 be concatenated onto the baseform (bsf) being constructed.

In step 2420, a $g_3$ decision is made that indicates whether there is no phonetic element context in storage having the same $P_{(i-)}P_i$ phonetic elements as in the "new" word piece being considered. If there is none, any stored phonetic context including the subject phonetic element (i.e., the phonetic element in the $P_i$ position of the "new" word piece being considered) is noted as is the associated fenemic model string thereof. (If more than one string is noted, one of the strings may be arbitrarily selected.) In step 2422, half the noted fenemic model string is concatenated onto the baseform being constructed. Step 2422 is then followed by step 2414.

After a fenemic model string is added onto the previously constructed portions of the baseform in steps 2404, 2416, the next piece of the "new" word is considered until all pieces of the "new" word have been considered. This is performed by steps 2406 and 2424. The fenemic models derived for each piece, having been concatenated, form a fenemic model baseform for the "new" word.

In accordance with the invention, fenemic word baseform synthesis based on phonetic element context may be employed for all or only some of the words that do not have trained fenemic baseforms. In those instances where two words—each with a known fenemic baseform—are joined to form a single word, the respective baseforms are joined to form a composite baseform for the single word. For example, suppose the words HOUSE and BOAT are joined to form the single word HOUSEBOAT. The fenemic baseform for the single word HOUSEBOAT will be formed by simply joining the fenemic baseform for the word HOUSE with the fenemic baseform for the word BOAT. Accordingly, the phonetic context approach need not—although it may—be employed for such words.

While the invention has been described with reference to a preferred embodiment thereof, it will be understood by those skilled in the art that various changes in form and details may be made without departing from the scope of the invention. For example, the phonetic contexts relied on may vary from the three-element contexts described hereinabove. Instead of two nearby elements, the highest order context may include any number n ($1 \leq n$) of nearby phonetic elements. Moreover, the phonetic elements in a context need not be adjacently positioned, but may be separated with one or more phonetic elements therebetween.

Furthermore, although described in terms of phonetic Markov models and fenemic Markov models, the present invention also contemplates the use of other types of models. That is, the present invention is intended to apply generally where words can be represented by a baseform of models from a first set of models and by a baseform of models from a second set of models, where the two baseforms can be aligned.

In addition, it should be observed that the term "word" be used in this patent application is broad in scope and is directed to dictionary words, lexemes (i.e., specific pronunciations of dictionary words as noted hereinabove), and parts of words—such as syllables—which may be used in defining speech that is to be recognized.

Still further, the methodology of FIG. 13 may be varied if desired. For example, the portion of a fenemic model string which is concatenated onto the pre-existing fenemic models of the baseform being constructed may vary from one-half.

Yet further, it should be noted that the dividing of fenemic baseforms into word pieces of phonetic element size may be performed by several techniques. In addition to the N-gram synthesis approach described hereinabove (wherein overlapping fenemic strings may result for the synthesized baseform), a longest-is-better synthesis may also be employed. In the latter approach, the phonetic sequence is divided so as to (a) minimize the number of pieces utilized and (b) maximize the lengths of the longest pieces used.

For example, in the longest-is-best scheme, one may compute all possible fenemic pieces corresponding to all possible sets of phone strings in the vocabulary. One then can define a criterion function:

$$f = l_1^2 + l_2^2 + l_3^2 \ldots l_n^2$$

where $l_1$=length of phone string 1; $l_2$=length of phone string 2; and so on such that $l_1 + l_2 \ldots + l_n = L =$ length of phone string corresponding to a new desired word. One would then pick a set of pieces so that f is a maximum. Note that this ideally would correspond to $$l_1 = L \; l_2 = l_3 \ldots, = \phi$$

as this maximizes f subject to the constraint $l_1 + l_2 \ldots + l_n = L$.

The present invention has been implemented on an IBM 3084 computer in the PL/I language embodying both the N-gram synthesis approach and the longest-is-better approach. In each case, useful fenemic baseforms were synthesized.

Synthesized baseforms perform at least as well as corresponding phonetic baseforms in a recognition task. For example, if the phonetic error rate were 4% on a standard task, a replacement of all phonetic baseforms by synthesized fenemic baseforms would result in an error rate of less than 4%.

The present invention saved at least a factor of 150% in training time by recording baseforms for the most frequently occurring 2000 words and synthesizing the less frequent 3000 words.

TABLE 1

THE TWO LETTERS ROUGHLY REPRESENT THE SOUND OF THE ELEMENT.
TWO DIGITS ARE ASSOCIATED WITH VOWELS:
FIRST: STRESS OF SOUND
SECOND: CURRENT IDENTIFICATION NUMBER
ONE DIGIT ONLY IS ASSOCIATED WITH CONSONANTS:
SINGLE DIGIT: CURRENT IDENTIFICATION NUMBER

| | | | | | | | | | |
|---|---|---|---|---|---|---|---|---|---|
| 001 | AA11 | 029 | BX2- | 057 | EH02 | 148 | TX5- | 176 | XX11 |
| 002 | AA12 | 030 | BX3- | 058 | EH11 | 149 | TX6- | 177 | XX12 |
| 003 | AA13 | 031 | BX4- | 059 | EH12 | 150 | UH01 | 178 | XX13 |
| 004 | AA14 | 032 | BX5- | 060 | EH13 | 151 | UH02 | 179 | XX14 |
| 005 | AA15 | 033 | BX6- | 061 | EH14 | 152 | UH11 | 180 | XX15 |
| 006 | AE11 | 034 | BX7- | 062 | EH15 | 153 | UH12 | 181 | XX16 |
| 007 | AE12 | 035 | BX8- | 126 | RX1- | 154 | UH13 | 182 | XX17 |
| 008 | AE13 | 036 | BX9- | 127 | SH1- | 155 | UH14 | 183 | XX18 |
| 009 | AE14 | 037 | DH1- | 128 | SH2- | 156 | UU11 | 184 | XX19 |
| 010 | AF15 | 038 | DH2- | 129 | SX1- | 157 | UU12 | 185 | XX2- |
| 011 | AW11 | 039 | DQ1- | 130 | SX2- | 158 | UXG1 | 186 | XX20 |
| 012 | AW12 | 040 | DQ2- | 131 | SX3- | 159 | UXG2 | 187 | XX21 |
| 013 | AW13 | 041 | DQ3- | 132 | SX4- | 160 | UX11 | 188 | XX22 |
| 014 | AX11 | 042 | DQ4- | 133 | SX5- | 161 | UX12 | 189 | XX23 |
| 015 | AX12 | 043 | DX1- | 134 | SX6- | 162 | UX13 | 190 | XX24 |
| 016 | AX13 | 044 | DX2- | 135 | SX7- | 163 | VX1- | 191 | XX3- |
| 017 | AX14 | 045 | EE01 | 136 | TH1- | 164 | VX2- | 192 | XX4- |
| 018 | AX15 | 046 | EE02 | 137 | TH2- | 165 | VX3- | 193 | XX5- |
| 019 | AX16 | 047 | EE11 | 138 | TH3- | 166 | VX4- | 194 | XX6- |
| 020 | AX17 | 048 | EE12 | 139 | TH4- | 167 | WX1- | 195 | XX7- |
| 021 | BQ1- | 049 | EE13 | 140 | TH5- | 168 | WX2- | 196 | XX8- |
| 022 | BQ2- | 050 | EE14 | 141 | TQ1- | 169 | WX3- | 197 | XX9- |
| 023 | BQ3- | 051 | EE15 | 142 | TQ2- | 170 | WX4- | 198 | ZX1- |
| 024 | BQ4- | 052 | EE16 | 143 | TX3- | 171 | WX5- | 199 | ZX2- |
| 025 | BX1- | 053 | EE17 | 144 | TX1- | 172 | WX6- | 200 | ZX3- |
| 026 | BX10 | 054 | EE18 | 145 | TX2- | 173 | WX7- | | |

TABLE 1-continued

THE TWO LETTERS ROUGHLY REPRESENT THE SOUND OF THE ELEMENT.
TWO DIGITS ARE ASSOCIATED WITH VOWELS:
FIRST: STRESS OF SOUND
SECOND: CURRENT IDENTIFICATION NUMBER
ONE DIGIT ONLY IS ASSOCIATED WITH CONSONANTS:
SINGLE DIGIT: CURRENT IDENTIFICATION NUMBER

| 027 | BX11 | 055 | EE19 | 146 | TX3- | 174 | XX1- |
| 028 | BX12 | 056 | EH01 | 147 | TX4- | 175 | XX10 |

TABLE 2

| PHONE | 3 DH | 7 NODES. | 13 ARCS. | | | 3 ARC LABELS. | | |
|---|---|---|---|---|---|---|---|---|
| NODE | 1 | 2 | 3 | 4 | 5 | 6 | 7 | |
| LABEL | 8 | 9 | 10 | 11 | 12 | 13 | 0 | |
| COUNT | 31.0 | 1.7 | 1.7 | 119.1 | 115.4 | 120.1 | 0.0 | |
| ARC | 1→2 | 1→4 | 1→7 | 2→3 | 2→7 | 3→7 | 3→7 | 4→4 | 4→5 | 5→5 |
| LABEL | 4 | 4 | NULL | 5 | NULL | 6 | NULL | 4 | 5 | 5 |
| PROB | 0.07243 | 0.92757 | 0.00000 | 0.99259 | 0.00741 | 0.93982 | 0.06018 | 0.75179 | 0.24821 | 0.74389 |
| ARC | 5→6 | 6→6 | 6→7 | | | | | | | |
| LABEL | 5 | 6 | 6 | | | | | | | |
| PROB | 0.25611 | 0.75370 | 0.24630 | | | | | | | |
| LABEL | 4 | 5 | 6 | | | | | | | |
| COUNT | 120.8 | 146.4 | 121.6 | | | | | | | |
| AE13 | | | 0.091 | | | | | | | |
| BX10 | 0.030 | | | | | | | | | |
| BX3_ | 0.130 | | | | | | | | | |
| BX8_ | 0.011 | 0.086 | | | | | | | | |
| DH1_ | 0.020 | 0.040 | 0.013 | | | | | | | |
| DQ2 | 0.011 | 0.052 | | | | | | | | |
| EHOT | 0.010 | 0.014 | 0.167 | | | | | | | |
| EHO2 | | | 0.026 | | | | | | | |
| EH11 | | | 0.015 | | | | | | | |
| EH13 | | | 0.012 | | | | | | | |
| EH14 | | | 0.062 | | | | | | | |
| ER14 | | | 0.024 | | | | | | | |
| FX2_ | | 0.045 | | | | | | | | |
| FX3_ | | 0.148 | | | | | | | | |
| GX2_ | | 0.013 | | | | | | | | |
| GX5_ | 0.148 | | | | | | | | | |
| GX6_ | 0.246 | 0.023 | | | | | | | | |
| HX1_ | | 0.011 | | | | | | | | |
| IX04 | 0.011 | | 0.020 | | | | | | | |
| IX13 | 0.025 | | 0.026 | | | | | | | |
| KQ1_ | | 0.014 | 0.024 | | | | | | | |
| KX2_ | | 0.013 | | | | | | | | |
| MX2_ | 0.029 | 0.043 | 0.012 | | | | | | | |
| NX3_ | 0.019 | | | | | | | | | |
| NX5_ | 0.049 | | | | | | | | | |
| NX6_ | | 0.017 | 0.012 | | | | | | | |
| OU14 | | | 0.023 | | | | | | | |
| PQ1_ | 0.029 | 0.018 | | | | | | | | |
| TH2_ | | 0.020 | | | | | | | | |
| TQ3_ | | 0.017 | | | | | | | | |
| UHOT | | | 0.020 | | | | | | | |
| UHO2 | 0.025 | 0.082 | 0.109 | | | | | | | |
| UXG2 | | | 0.016 | | | | | | | |
| UX12 | | | 0.062 | | | | | | | |
| UX13 | | | 0.183 | | | | | | | |
| VX1_ | | | 0.016 | | | | | | | |
| UX3_ | 0.041 | 0.283 | 0.016 | | | | | | | |
| WX2_ | 0.023 | 0.014 | | | | | | | | |
| XX23 | 0.072 | | | | | | | | | |
| OTHER | 0.073 | 0.047 | 0.048 | | | | | | | |

We claim:

1. A method of synthesizing word baseforms for words wherein each synthesized baseform represents a series of models from a first set of models, each model of the first set corresponding to an output-related model wherein each output-related model correlates to an output generable by an acoustic processor, the method comprising the steps of:

(a) forming words as respective sequences of models from a second set of models, each model of the second set corresponding to a phonetic model;

(b) for a second set model occurring in a given context of second set models in step (a), storing a respective string of first set models;

(c) performing step (b) for each of at least one second set model; and (d) constructing a word baseform of first set models for a word formed in step (a), including the step of representing each piece of a word that corresponds to a second set model in a given context by the stored respective string of first set models, if any, corresponding thereto.

2. A method of synthesizing word baseforms for words not spoken during a training session, wherein each synthesized baseform represents a series of output-related models and wherein each output-related model correlates to an output generatable by an acoustic processor, the method comprising the steps of:

(a) representing each of N words by a respective sequence of phonetic models, the positioning of a subject phonetic model relative to other phonetic models forming a phonetic context for the subject phonetic model;

(b) representing M words spoken during a training session by a series of output-related models, where the M words form a subset of the N words;

(c) for at least one subject word, aligning the phonetic models for the subject word against the output-related models for the subject word, the subject word having been spoken during the training session;

(d) from the alignment of output-related models and phonetic models, associating a string of output-related models with each of at least one respective phonetic model in a given context; and (e) constructing an output-related model baseform for a word not spoken during the training session including the steps of (i) correlating a piece of said word not spoken during the training session to a phonetic model in a defined context; (ii) determining if the phonetic model in said defined context corresponds to a similarly contexted phonetic model that has an associated string of output-related models; and (iii) representing said word piece by said associated string.

3. The method of claim 2 comprising the further step of:

(f) identifying the context of a phonetic model based on the positioning of the phonetic model relative to n other phonetic models, where n is an integer greater than or equal to zero;

wherein the associated string of step (e)(iii) is the string of output-related models associated with the similarly contexted phonetic model having the highest n value.

4. The method of claim 3 wherein step (e) further includes the step of:

(iv) for said word not spoken during the training session, repeating steps (i), (ii), and (iii) for each piece thereof;

each word piece having a string of output-related models associated therewith.

5. The method of claim 4 wherein step (e) further includes the step of:

(v) concatenating the strings in the same order as the word pieces said strings represent to form a word baseform of output related models.

6. A method of synthesizing word baseforms for words not spoken during a training session, wherein each synthesized baseform represents a series of fenemic models and wherein each fenemic model correlates to a label output generatable by an acoustic processor, the method comprising the steps of:

(a) uttering known words during a training session, each known word uttered during the training session being formed of a known sequence of known word phonetic models;

(b) determining a context for a subject known word phonetic model based on the positioning of other phonetic models proximate to said subject phonetic model;

(c) repeating step (b) for one known word phonetic model after another as said subject phonetic model;

(d) representing at least some of the known words by a series of fenemic models;

(e) for a subject known word, aligning the phonetic models therefor against fenemic models representing said subject word;

(f) repeating step (e) for each of a plurality of subject words;

(g) associating a string of fenemic models with a respective known word phonetic model in a given context; and (h) constructing a fenemic baseform for a new word not spoken during the training session including the steps of (i) correlating a piece of said new word not spoken during the training session with a new word phonetic model in a defined context; (ii) determining if the new word phonetic model in said defined context corresponds to a similarly contexted known word phonetic model that has an associated string of fenemic models; and (iii) representing said word piece by said associated string.

7. The method of claim 6 wherein step (g) comprises the step of:

(j) forming a string of fenemic models for a given known word phonetic model in a given context from multiple utterances during the training session of the given known word phonetic model in the given context.

8. The method of claim 7 wherein step (b) includes the step of:

(k) storing a context for a phonetic model based on the phonetic model occurring therebefore and the phonetic model occurring thereafter.

9. The method of claim 8 wherein step (h) further includes the steps of:

(l) determining whether a new word phonetic model has the same preceding phonetic model and the same succeeding phonetic model as a known word phonetic model; and (m) representing the word piece corresponding to the new word phonetic model by the string of fenemic models for the known word phonetic model.

10. The method of claim 9 wherein step (h) further includes the steps of:

(n) determining whether a new word phonetic model has only the same preceding phonetic model as a known word phonetic model; and (p) representing the word piece corresponding to the new word phonetic model by a leading portion of the string of fenemic models for the known word phonetic model.

11. The method of claim 10 wherein step (h) further includes the steps of:

(q) determining whether a new word phonetic model has only the same succeeding phonetic model as a known word phonetic model; and (p) representing the word piece corresponding to the new word phonetic model by a trailing portion of the string of fenemic models for the known word phonetic model.

12. The method of claim 10 wherein step (h) includes the further step of:

(s) determining whether a new word phonetic model has neither the same preceding phonetic model nor the same succeeding phonetic model as a known word phonetic model; and (t) representing the word piece corresponding to the new word phonetic model by a string of fenemic models for the known word phonetic model preceded or succeeded by any phonetic models.

13. In a speech recognition system which has a known phonetic baseform for each word, apparatus for synthesizing fenemic word baseforms for words not uttered during a training session, wherein each synthesized baseform represents a series of fenemic models based on label outputs generatable by an acoustic processor, the apparatus comprising:

(a) means for storing information identifying phonetic models and respective phonetic model contexts occurring during the training session;

(b) means for storing a respective string of fenemic models for a stored phonetic model in a given context occurring during the training session; and (c) means for constructing a word baseform of fenemic models for a new word not spoken during the training session, which includes;

means for determining, for each new word phonetic model corresponding to a piece of the new word, a stored phonetic model and context which at least partially corresponds to the new word phonetic model in context; and means for assigning to each piece of the new word at least a portion of the fenemic string stored for the determined stored phonetic model and context therefor.

14. A method of producing a synthesized word baseform for a first word not spoken during a training session, said synthesized baseform comprising a series of models from a first set of models, each model in the first set of models representing a unit of speech, each unit of speech having a size, said method comprising the steps of:

forming an intermediate word baseform of the first word, said intermediate word baseform comprising at least a second model from a second set of models, said second model having a context in the intermediate word baseform, each model in the second set representing a unit of speech different from the units of speech represented by the models of the first set of models, each unit of speech represented by the models of the second set having a size larger than the size of the largest unit of speech represented by a model of the first set;

correlating the second model, in its context in the intermediate word baseform, with a first series of models from the first set of models; and replacing the second model in the intermediate word baseform with the first series of models to produce a synthesized word baseform.

15. A method as claimed in claim 14, characterized in that:

each model in the first set of model represents a fenemic unit of speech; and each model in the second set of model represents a phonetic unit of speech.

16. A method as claimed in claim 14, characterized in that:

the intermediate word baseform comprises at least a third model from the second set of models, said third model preceding the second model in the intermediate word baseform; and the step of correlating comprises correlating the second model, when it is preceded by the third model, with a first series of models from the first set of models.

17. A method as claimed in claim 14, characterized in that:

the intermediate word baseform comprises at least a fourth model from the second set of models, said fourth model following the second model in the intermediate word baseform; and the step of correlating comprises correlating the second model, when it is followed by the fourth model, with a first series of models from the first set of models.

18. A method as claimed in claim 14, characterized in that:

the intermediate word baseform comprises at least third and fourth models from the second set of models, said third model preceding the second model in the intermediate word baseform, said fourth model following the second model in the intermediate word baseform; and the step of correlating comprises correlating the second model, when it is preceded by the third model and when it is followed by the fourth model, with a first series of models from the first set of models.

19. A method as claimed in claim 14, characterized in that the step of correlating comprises the steps of:

forming an intermediate word baseform of a second word, said second word being different from the first word, said intermediate word baseform of the second word comprising at least the second model, said second model having a context in the intermediate word baseform of the second word which is the same as the context of the second model in the intermediate word baseform of the first word;

forming a training word baseform of the second word by uttering the second word, said training word baseform of the second word comprising a series of models from the first set of models; and aligning the intermediate word baseform of the second word with the training word baseform of the second word to align the second model in the intermediate word baseform of the second word with a first series of models in the training word baseform of the second word.

* * * * *